Figure 1:
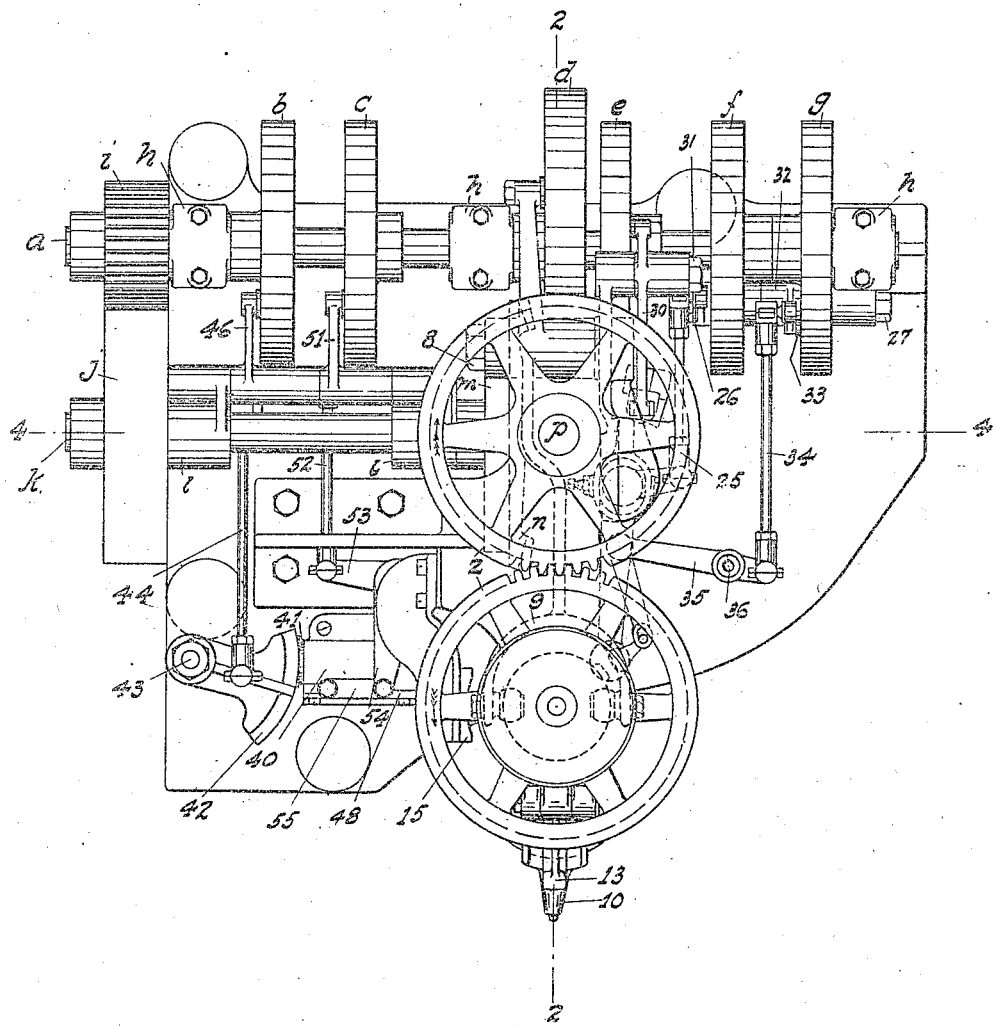

H. A. KLEMM.
BAG TYING MACHINE.
APPLICATION FILED APR. 19, 1910.

1,084,549.

Patented Jan. 13, 1914.
11 SHEETS—SHEET 1.

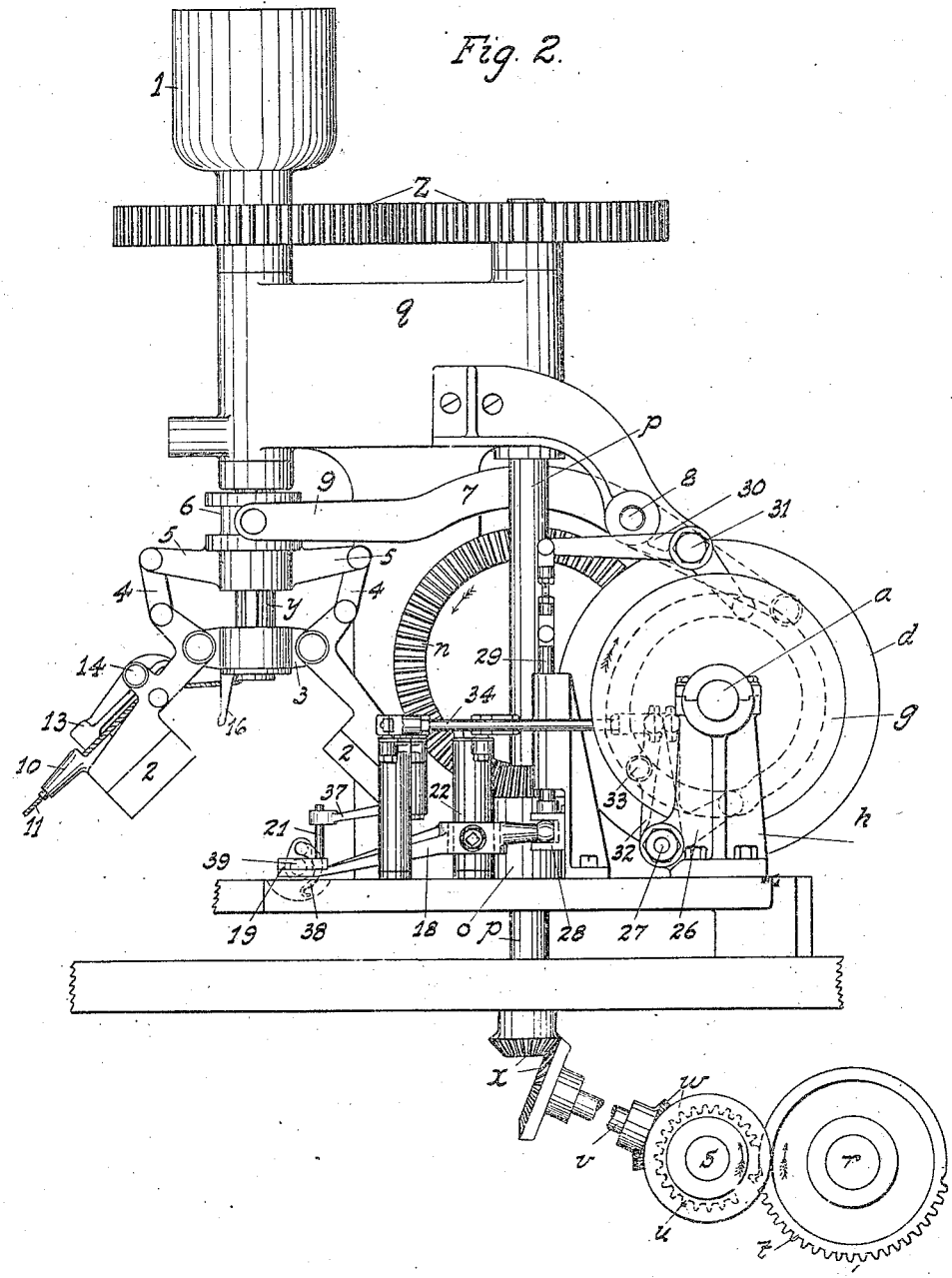

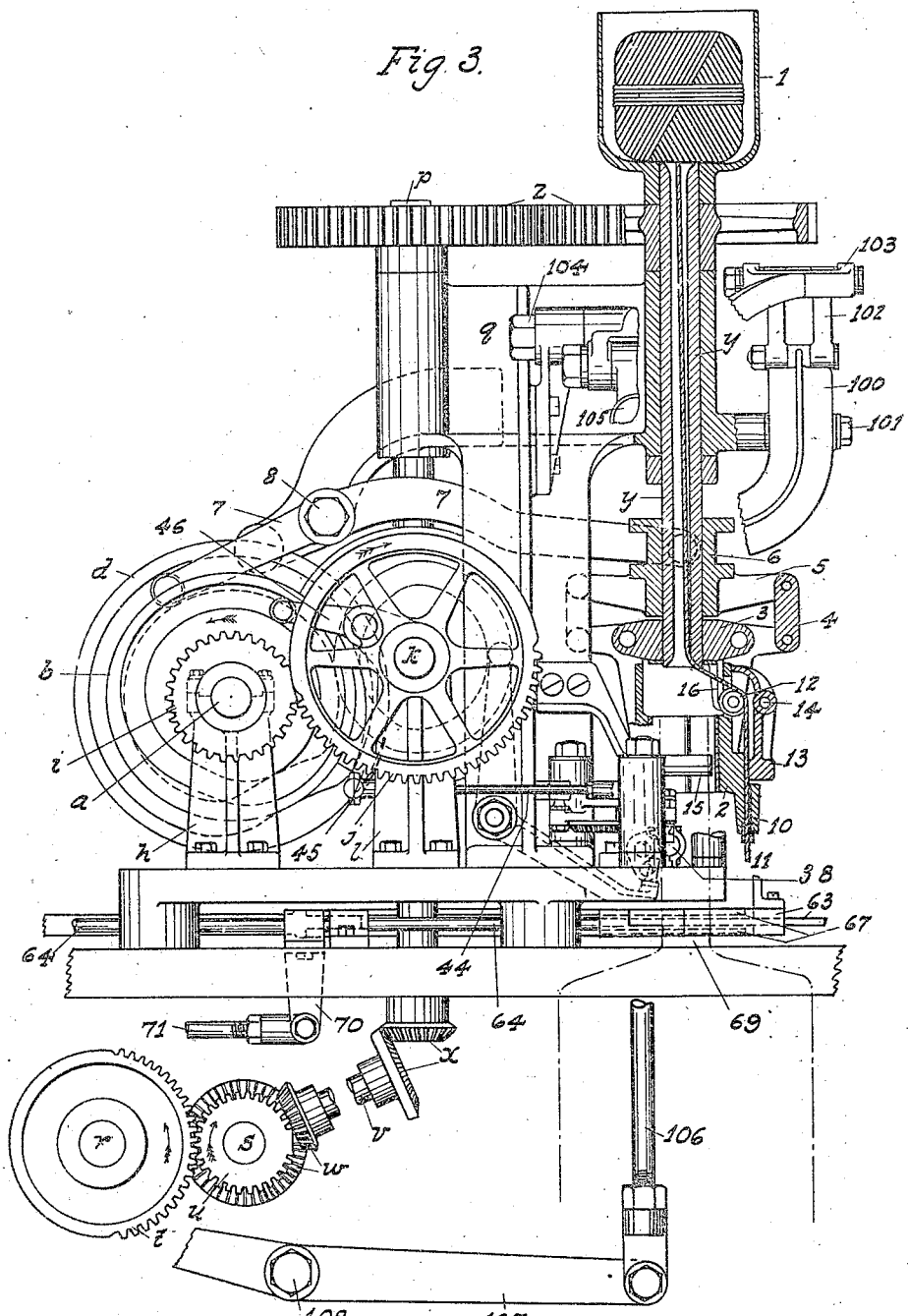

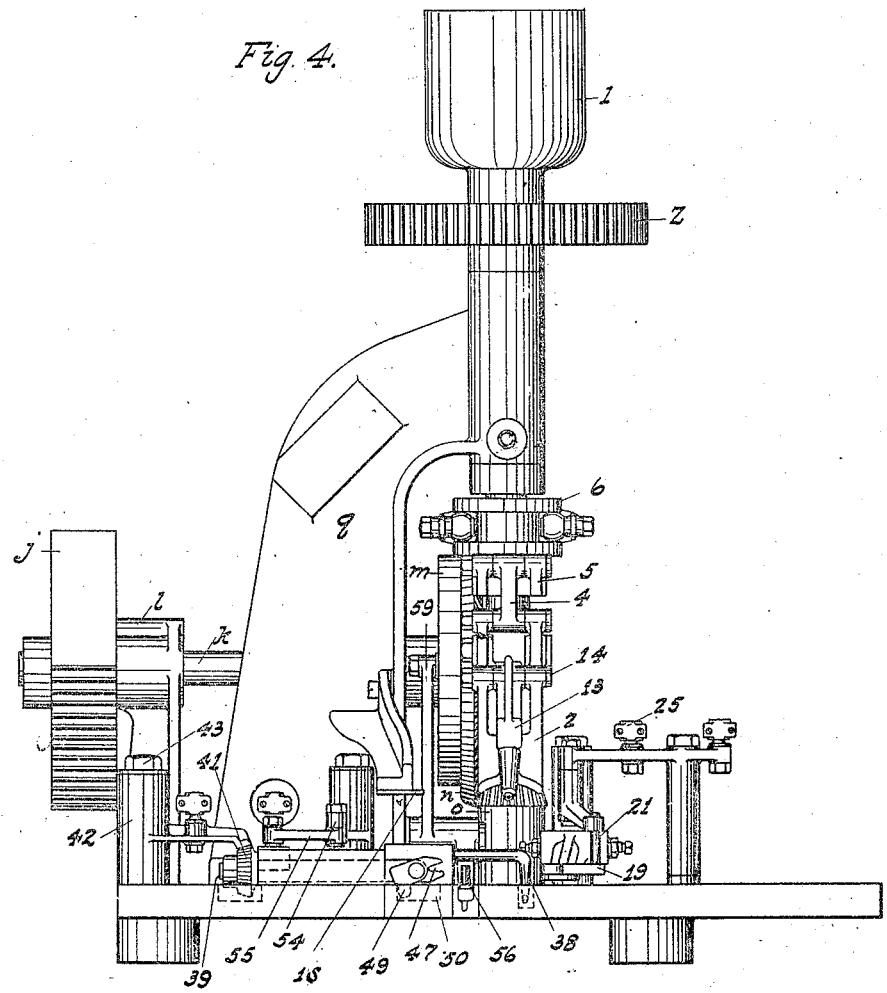

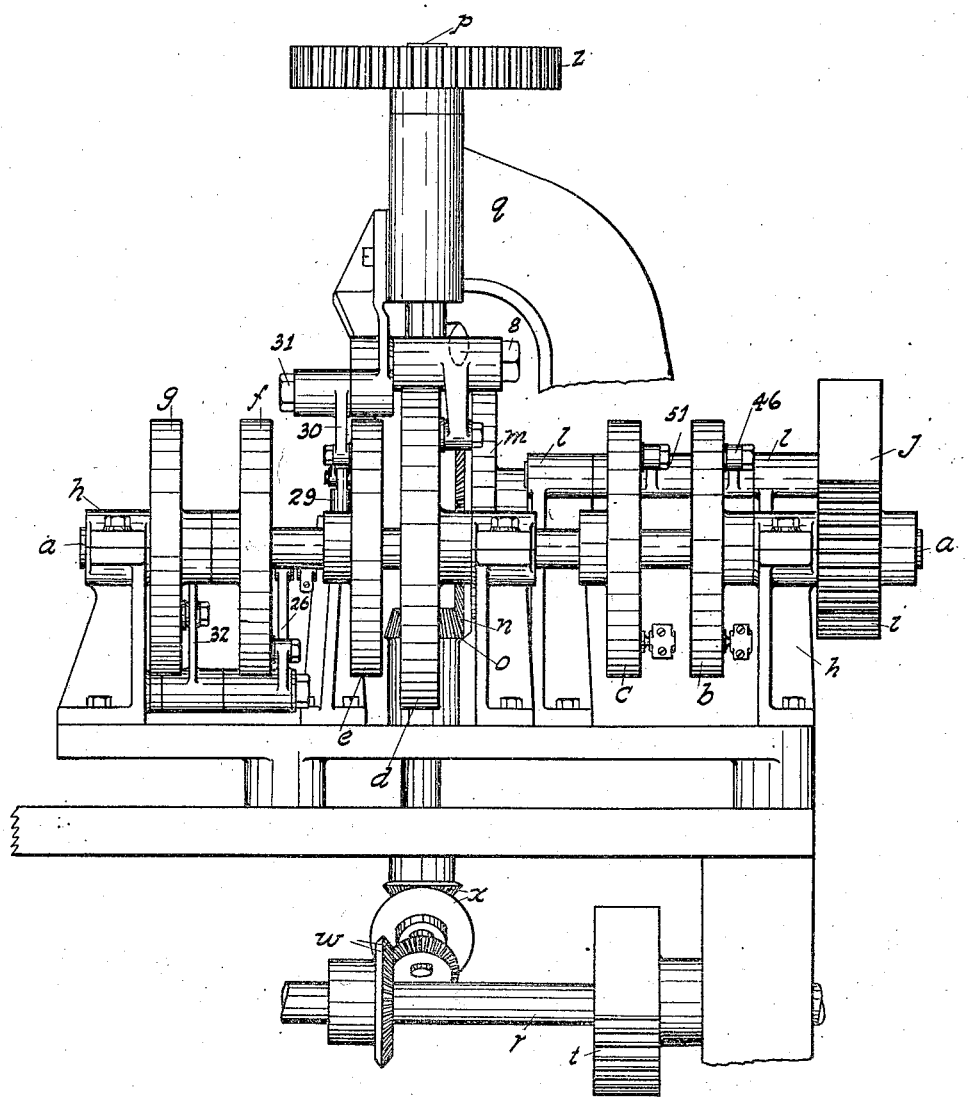

H. A. KLEMM.
BAG TYING MACHINE.
APPLICATION FILED APR. 19, 1910.

1,084,549.

Patented Jan. 13, 1914.
11 SHEETS—SHEET 6.

Witnesses:
Andrew H. Dirk
L. F. Browning

Inventor
Hermann A. Klemm
By his Attorney
Edward C. Davidson

H. A. KLEMM.
BAG TYING MACHINE.
APPLICATION FILED APR. 19, 1910.

1,084,549.

Patented Jan. 13, 1914.
11 SHEETS—SHEET 7.

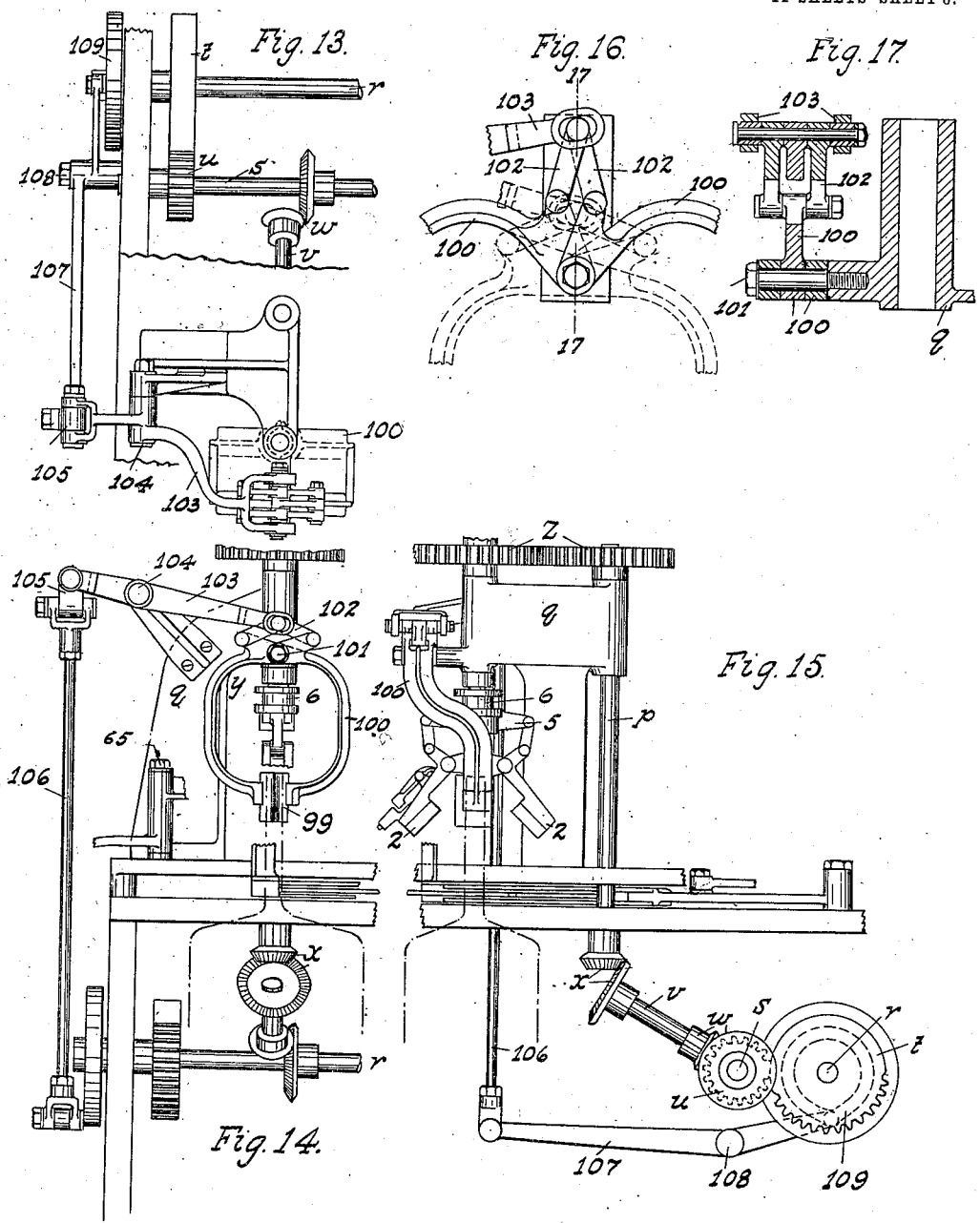

H. A. KLEMM.
BAG TYING MACHINE.
APPLICATION FILED APR. 19, 1910.

1,084,549.

Patented Jan. 13, 1914.
11 SHEETS—SHEET 9.

H. A. KLEMM.
BAG TYING MACHINE.
APPLICATION FILED APR. 19, 1910.

1,084,549.

Patented Jan. 13, 1914.
11 SHEETS—SHEET 11.

Witnesses:
Andrew H. Dirk
L. F. Browning

Inventor
Hermann A. Klemm
By his Attorney
Edward C. Davidson

UNITED STATES PATENT OFFICE.

HERMANN A. KLEMM, OF HARRISON, NEW YORK.

BAG-TYING MACHINE.

1,084,549.  Specification of Letters Patent.  Patented Jan. 13, 1914.

Application filed April 19, 1910. Serial No. 556,375.

*To all whom it may concern:*

Be it known that I, HERMANN A. KLEMM, a citizen of the United States, residing in Harrison, county of Westchester, State of New York, have invented certain new and useful Improvements in Bag-Tying Machines, of which the following is a specification.

The bag tying machine forming the subject of this invention comprises a set of bag neck closers constructed and operated to move downwardly over, close and hold the mouth of a bag after it has been creased and closed by an independent preliminary closer and after the neck at its lower part has been gathered and held closed by another independent preliminary closer; a thread or twine carrier adapted to wrap the thread or twine around the neck between the lower preliminary closer and the lower edge of the mouth closer or holder, said twine carrier and bag mouth closer and holder being connected to the lower end of a hollow vertical revolving shaft through which the twine passes from a twine holder at the upper end of the shaft; a gripping device for holding the leading end of the twine; a hooked finger for drawing the leading end of the twine through the loops adapted to lie against the neck of the bag, and over which the twine is also wrapped; means for setting the leading end of the twine in the hook of the finger; means for actuating the finger to cause it to draw the leading end of the twine down between the wrapped strands of the twine and the neck of the bag; a guide pin for presenting the feeding part of the twine to a cutter, and a cutter for severing the feeding end of the twine after it is held by the leading end of the twine, which is drawn over it by the hooked finger.

It also includes special mechanisms and controlling cams so timed and arranged as to insure all of the bag neck creasing and closing devices and the twine tying and other devices working in unison, as will be hereafter fully explained by reference to the accompanying drawings, in which—

Figure 7:
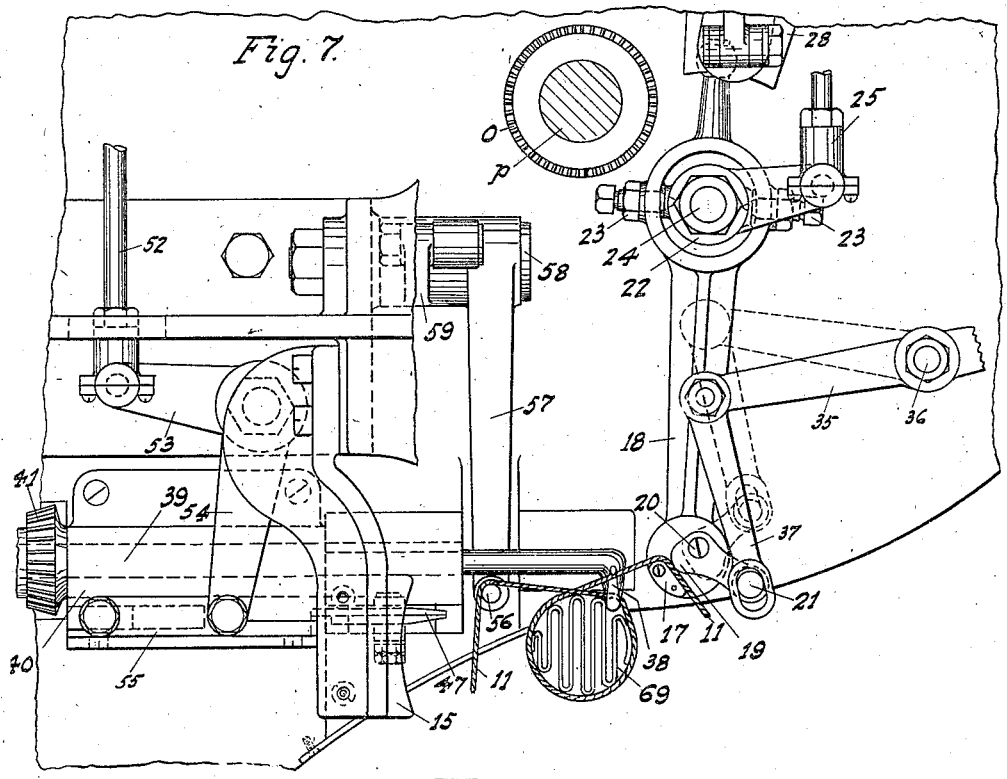
Figure 8:
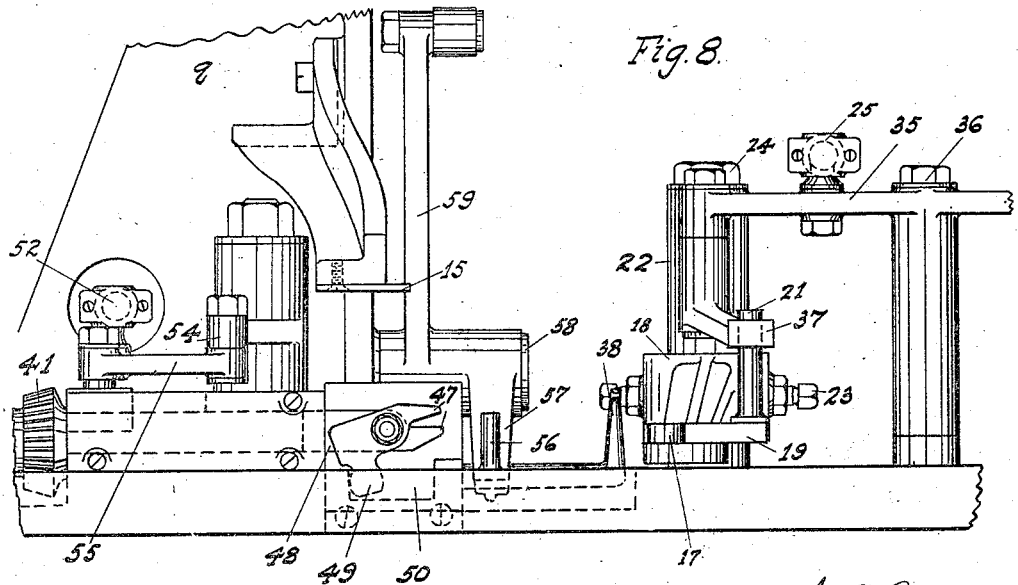
Figure 18:
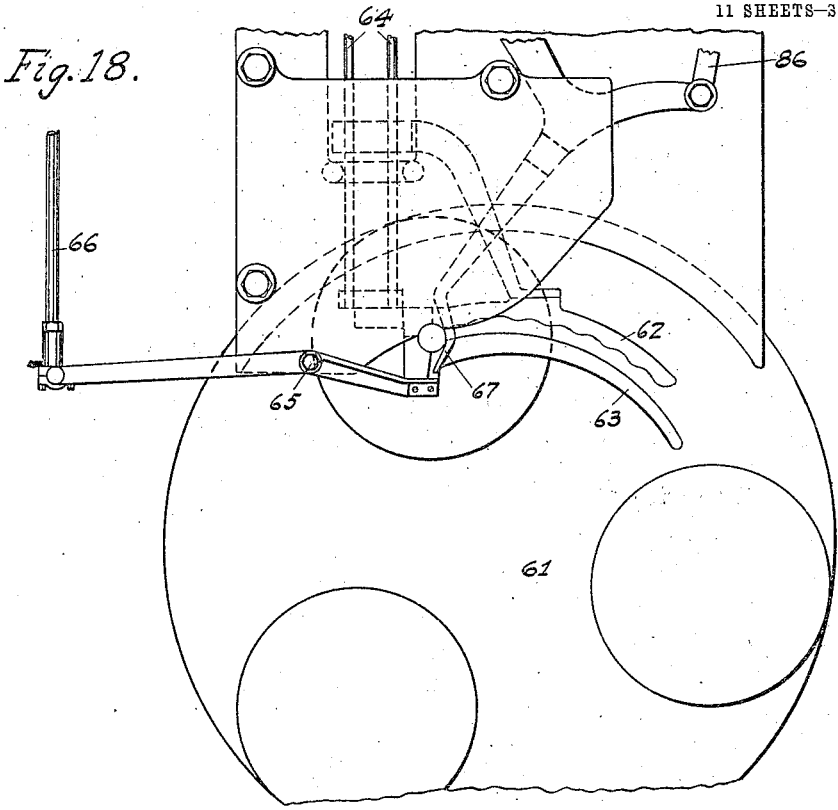
Figure 19:
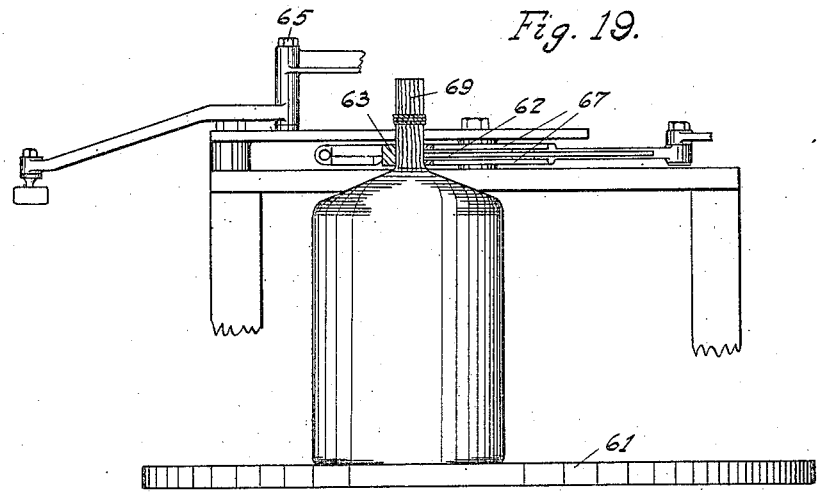
Figure 20:
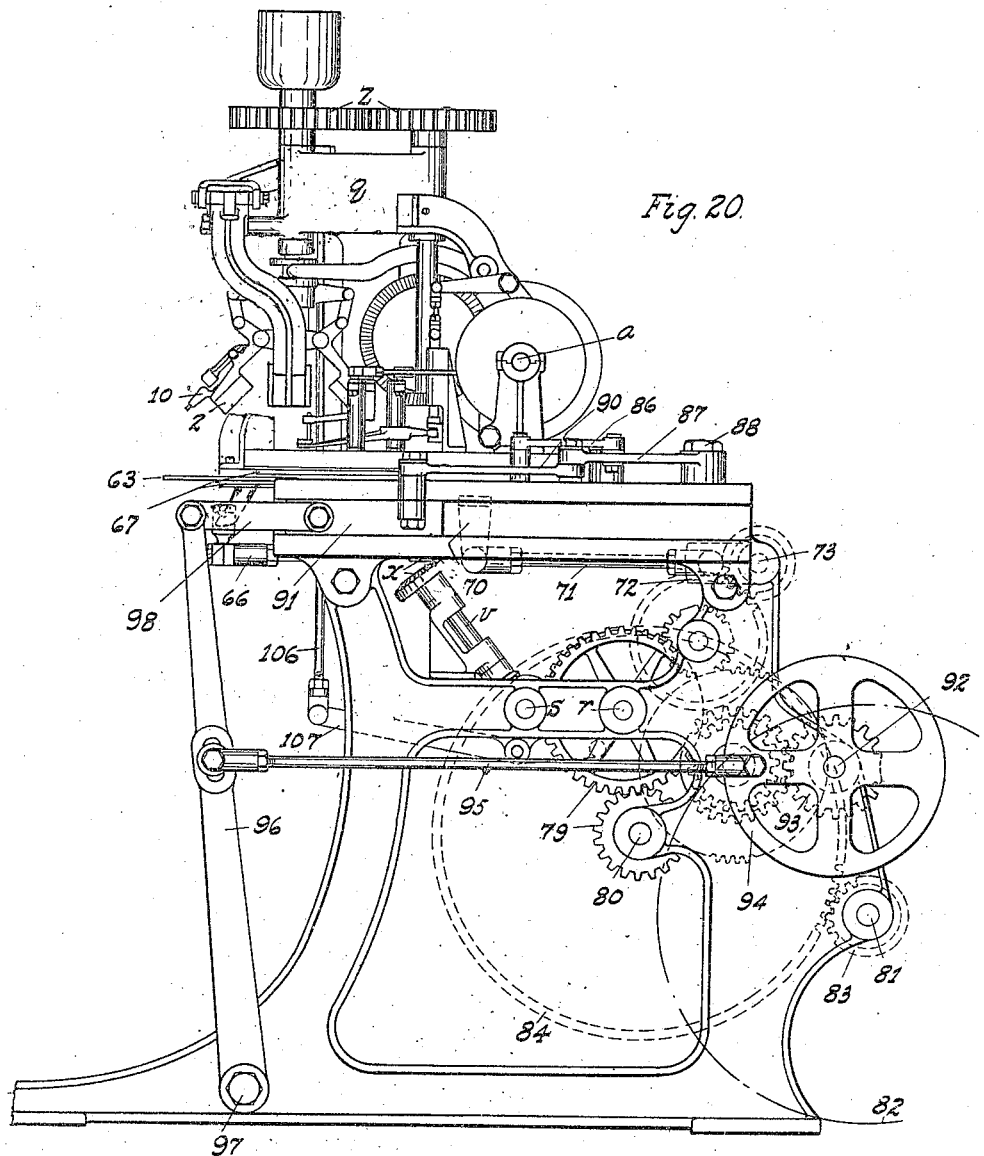
Figure 21:
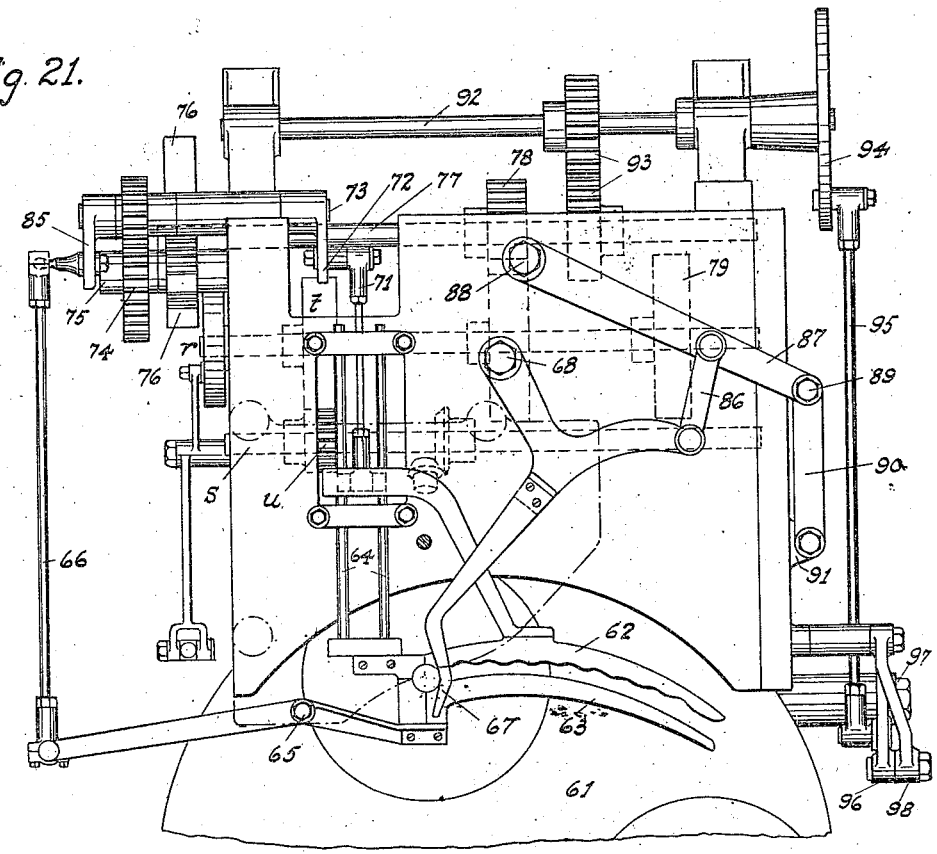
Figure 22:
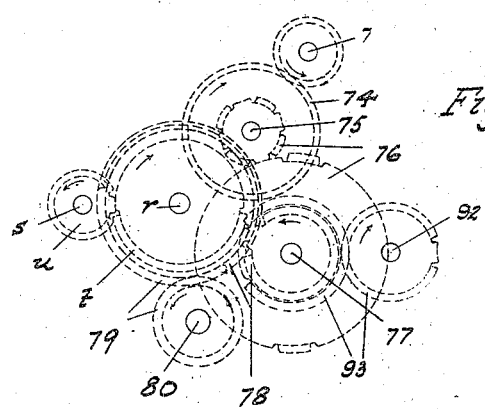

Figure 1 is a plan view of the machine; Fig. 2 is a right-hand side elevation with all the parts omitted that would show beyond the line 2, 2, Fig. 1; Fig. 3 is a left-hand side elevation showing the twine carrier and its shaft in section; Fig. 4 is a front elevation, with the parts beyond the line 4, 4, Fig. 1 omitted; Fig. 5 is a transverse section of the bag mouth closers, showing plan of the twine carrier; Fig. 6 is a rear elevation with all parts in front of the line 4, 4, Fig. 1, omitted; Fig. 7 is a plan view of a portion of the machine on an enlarged scale, showing the clamping and wrapping of the twine just before the cutter is actuated; Fig. 8 is a front elevation of the parts shown in Fig. 7, the neck of the bag and the twine being omitted; Figs. 9, 10, 11 and 12 illustrate different stages in the method of tying bags according to this invention; Fig. 13 is a part plan view of the machine showing the creasing and closing device that acts on the mouth of the bag to preliminarily close it; Fig. 14 is a front view of the same, also showing the bag mouth closer and holder and the preliminary neck creaser and closer; Fig. 15 is a side elevation of the parts shown in Fig. 14; Fig. 16 on an enlarged scale illustrates the lever connections of the bag mouth creasers; Fig. 17 is a section taken on line 17, 17, Fig. 16; Fig. 18 is a plan view of the preliminary bag neck creasers and closers; Fig. 19 is an elevation of the same; Fig. 20 is a right-hand side elevation, similar to Fig. 2, but on a smaller scale, showing the preliminary neck closer and preliminary mouth closer and driving and controlling gears, &c.; Fig. 21 is a plan view of Fig. 20 with the upper part of the machine removed, and Fig. 22 shows diagrammatically the gear system.

The twine controlling and tying mechanism will first be described, it being assumed that the preliminary bag neck closer and mouth closer have performed their functions, and their construction and operation will be hereafter described.

The shaft $a$ which carries the cams $b$, $c$, $d$, for actuating the tying finger, the cutter and bag mouth closer and holder respectively, and the cams $e$, $f$ and $g$ for operating and controlling the clamp for holding the leading end of the twine, is held in bearings $h$ extending upwardly from the bed of the machine. This shaft $a$ has secured to its end a pinion $i$, with a blank space, into which meshes a segmental gear $j$ with the teeth thereof occupying one-half the circumference, the other half being a plain periphery which fits against the blank space of the pinion $i$, the arrangement being such that intermittent motion is imparted to the shaft $a$, it making a full revolution during one half revolution of the gear $j$ and remains stationary during the other half revolution of $j$. The gear $j$ is secured to one end of a shaft $k$ held in bearings $l$, and to its other end is secured a cam $m$, for controlling a twine directing pin, and a bevel wheel $n$ into which meshes a pinion $o$ carried by a vertical shaft $p$ having an upper bearing in the frame standard $q$ and a lower bearing in the base of the frame. Motion is imparted to the vertical shaft $p$ from the shaft $r$ acting on the intermediate shaft $s$ through the intermittent gear $t$, $u$, similar to the gear $i$, $j$ before described. The shaft $v$ by the bevel gear $w$ and the bevel gear $x$ connects the shaft $s$ to the vertical shaft $p$. This intermittent motion provides for the machine stopping long enough for a bag to be placed in and removed from operative position, and for the preliminary neck and mouth creasers and closers to perform their functions.

In front of the shaft $p$ is a hollow vertical shaft $y$, having a bearing in the frame standard $q$, the two shafts being connected together by a pair of spur wheels $z$. This shaft $y$ carries at its upper end a twine holder, which may be of any suitable construction, shown as a cup 1 adapted to hold a ball of twine, and at its lower end the device for closing and holding the upper part of the neck or mouth of the bag while the tying twine is being applied to the neck below said device. This device consists of a set of jaws 2 pivoted to a collar 3 and connected by links 4 to arms 5 extending from the grooved sleeve 6 fitted to slide on and rotate with the shaft $y$. This sleeve is controlled from the cam $d$ by the lever 7 pivotally connected at 8 to a bracket extending from the standard $q$, said lever having a roller at one end working in the groove of the cam and a fork 9 at the other end provided with stud rollers extending into the groove of the sliding sleeve 6. On one of the mouth closers 2 is secured the twine carrier 10, through which the twine 11 passes from the small guide pulley 12, also carried by the same mouth closer, said twine going to the guide pulley from the lower end of the shaft $y$ after passing down the bore of the shaft from the ball of twine held in the holder 1, see Fig. 3.

On the side of the closer 2 is a tension presser 13 pivoted at 14 and arranged to be forced against the twine as it enters the carrier 10 by coming in contact with and sliding along the edge of a cam ledge 15 on a bracket extending from the standard $q$, said ledge being so arranged and of such an extent as to cause the twine to be properly held under tension during a portion of the time of each revolution the twine carrier is wrapping it around the neck of a bag. The finger 16, which is shown secured to the collar 3, acts as a guide for the twine as it leaves the lower end of the shaft $y$ to pass to the small pulley, when the neck closers 2 are in open position as shown at Fig. 2 and in closed position as shown at Fig. 3. This finger 16 also acts as a stop for the jaws 2.

The grippers for holding the leading end of the twine while it is being wrapped around the neck of a bag consists of a jaw 17 on the end of the lever 18 and a movable jaw 19 pivoted at 20 on the lever 18 and having a pin 21 extending upwardly from an arm by which it is moved to close on the twine when it is placed between the jaws and to open to release the twine when the tying device is pulling the leading end of the twine through the loops on the neck of the bag. The end of the lever 18 with the gripping jaws has a compound motion; it moves to and from the center of operation of the tying device to permit the free or leading end of the twine extending from the twine carrier to pass between and be gripped by the jaws and to place the held leading end of the twine over the hooked finger at the proper times, and it has a vertical movement to lift the leading end of the twine over the hooked finger, which projects upwardly through the loops of twine wrapped around the neck of the bag, so that the finger by its hook may draw the leading end down between the loops and the neck of the bag, the movable jaw 19 opening to free the end of the twine as the finger is thus acting.

The lever 18 is yoked over a sleeve 22 and connected thereto by horizontal pivots 23, the sleeve being fitted to rock on a vertical stud 24, the upper end of the sleeve being connected by an arm to one end of a link 25 the other end of which connects to one of the branches of a two branched lever 26 having a rocking connection to the frame at 27 and pivoted on its other branch with a roller working in the groove of the cam $f$; the action of said cam and connections being to swing the gripping jaws 17—19 horizontally. To impart the vertical movement to them the other end of the lever 18 is provided with a roller embraced by a slotted head 28 on the lower end of a vertical rod 29 to the upper end of which is connected one end of a lever 30 pivoted at 31 to a bracket extending from the standard $q$ and having at its other end a roller working in the groove of the cam $e$.

The cam $g$ actuates the movable jaw 19 of the twine gripper through the medium of the lever 32 having a roller 33 working in the groove of the cam, a rod 34 connecting the end of the lever to the short arm of a lever 35 rocking on a vertical stud 36, the long arm of said lever having a downwardly extending stud on which is seated a sleeve provided with an arm 37 having a slot at its end which embraces the pin 21 of the movable jaw 19, this latter connection being such that the pin 21 is free to slide vertically in the slot of the arm 37. The slot affords freedom to the gripping jaws 17—19 to move to and from the neck of the bag without affecting the function of the jaw 19.

Figure 9:
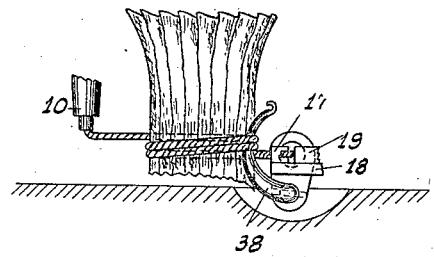
Figure 10:
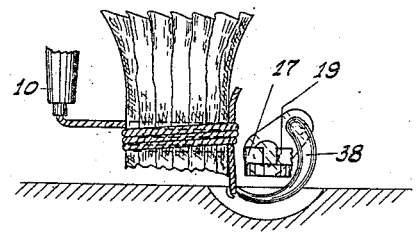
Figure 11:
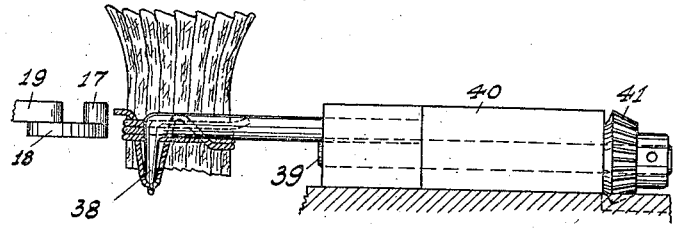

The means for securing the twine on the neck of the bag consists of a curvilinear finger 38 having a hook at its end and carried on one end of a shaft 39 fitted to be rotatably reciprocated in the block bearing 40 secured to the bed or base plate of the machine. The finger 38 is so located that in one position it lies close to the neck of the bag, as shown at Figs. 7 and 9, so as to be within the loops of the twine laid around the neck by the carrier 10, and in the other position is away from the neck of the bag as shown at Figs. 2 and 4, it having in moving to this position drawn the leading end of the twine down between the loops and the neck of the bag, as seen at Figs. 10 and 11. To impart the rocking motion to the finger 38 a bevel pinion 41 is secured to the other end of the shaft 39, and into this pinion meshes a segmental bevel gear 42, having its axis on a stud 43 extending upwardly from the bed of the frame; a connecting rod 44 connects the gear 42 to the lower arm 45 of a bell crank lever rocking on a shaft supported by the bearing standards $l$ and having at the end of its other arm 46 a roller working in the groove of the cam $b$.

The cutting of the twine after it is wrapped around the neck of the bag is effected by the shears 47, carried on a sliding bar 48 seated in a suitable bearing in the side of the block bearing 40, one of the blades of the shears being connected to or forming a part of the sliding bar 48 and the other blade pivotally connected to said bar and having an extended toe 49 adapted to play between the ends of a groove 50 in the frame of the device in such manner that when the toe strikes the rear end of the groove the movable blade is opened away from the fixed one, as shown at Figs. 4 and 8, and when the toe strikes the front end of the groove as the slide is moved forward, the open shears then closes on the twine near the twine carrier, and so severs the twine. This sliding bar 48 is operated from the cam $c$ through the medium of the bell crank lever 51, similar to and rocking on the same shaft with the bell crank lever 46, the lower arm of the lever 51 being connected by a rod 52 to one arm 53 of a vertically pivoted bell crank lever, whose other arm 54 is connected to the sliding bar 48 by a link 55.

To guide and hold the twine in proper position for the shears 47 to act thereon a pin 56 is raised in the path of the twine, between it and the neck of the bag, during the wrapping of the last loop by the carrier 10, and holds the twine as this last loop is finished and as the carrier is about to stop, the shears at this time move quickly forward and severs the twine, it being held under tension as the carrier 10 is in front of the tension ledge 15 and the pressers 13 forced against the twine just above where it enters the carrier's eye. The pin 56 is carried at the end of a swinging arm 57 of a bell crank lever fitted to rock on a stud 58 extending from the lower part of the frame standard $q$, the other arm 59 of the lever extending upwardly and provided with a roller working in the groove of the cam $m$ on the shaft $k$.

The bag mouth closers 2 are shown on an enlarged scale in Fig. 5, composed of two members or jaws, each in cross section, being a semi-circle with one end flared outwardly as at 60, to insure gathering together all of the upper part of the neck or mouth of the bag.

Figure 12:
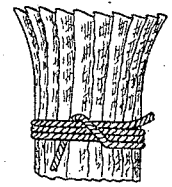

The method of tying the twine is clearly shown by Figs. 7, 9, 10, 11 and 12, and from what has been described a brief reference to the operation of the various devices of the machine will only be necessary in considering the procedure of tying the necks of bags by this system. A bag being in position to be tied with the neck and mouth preliminarily crimped together or closed, the first action of the machine is the closing down of the mouth closers and holders 2 over the mouth of the bag, and the gripping of the free end of the twine as the carrier passes by the grippers 17—19, which are then in a low position, the hooked finger 38 at this time being against the side of the neck. The twine carrier revolves around the neck of the bag for four laps, as shown, but this number of laps may be varied as desired by proper proportioning of the gearing, particularly the gears $w$ and $x$. When the carrier is about to finish the last lap to form the last loop the guide pin 56 rises so that the twine passes around it, the grippers 17—19 also approach the neck of the bag and rise and lift the leading end of the twine over the top of the hooked finger 38, the said twine passing down in front of the hook as the grippers move down and back. Both the leading end and the feeding part of the twine are under tension and as the hooked finger 38 moves down to draw the leading end behind the loops the twine is tightly drawn against the loops, and when the tension on the twine is sufficient to insure the tie holding, the grippers open, releasing the end of the twine which is ultimately drawn entirely through the loops, as shown at Fig. 12. The only thing to complete the operation is severing the twine at the feeding end or part of the twine leaving the carrier, which is accomplished by the shears 47 as before described. All of the devices then assume the normal inactive positions and remain so until another bag is in position to be tied and the teeth of the main driving gear $t$ act on the pinion $u$.

An apparatus suitable for preliminary creasing or gathering and holding the lower part of the necks of bags and to operate in conjunction with the other parts of this bag tying machine is shown at Figs. 18 and 19. Its special features of construction form no part of this invention, so a brief description of the same will be sufficient for the purposes of this specification. A platform 61 is provided adapted to be rotated from some suitable motor part of the machine. Filled bags to be tied are placed at proper intervals on the platform 61 which presents them consecutively to the creasing or gathering jaws 62 and 63, the inner one 62 being carried on sliding rods 64, and the outer one 63 pivoted at 65 on the bed of the machine, and to an arm of which is connected a rod 66, and the neck pusher 67 on the end of a horizontal rocking arm pivoted at 68 on the bed, see Fig. 21, are in open position when the bag passes between them and are gradually closed on to the lower part of the neck until finally they closely hug the neck of the bag, indicated by 69, as shown in Figs. 3, 18, 19 and 21. These parts are actuated as follows:—The sliding rods 64 are by the block 70 and the rod 71 connected to a crank 72 on the end of a shaft 73. This shaft receives motion by the gears 74 from a sleeve on a stud bearing 75 which is intermittently partly rotated by the mutilated and locking pair of gears 76, the large one of which is on the shaft 77. This shaft 77 is intermittently driven from the shaft $r$ by the mutilated gears 78, the shaft $r$ being continuously driven, by the gear wheels 79, from the shaft 80, and this shaft may receive motion from a driving shaft 81, having a pulley 82, and a pinion 83 working into a large gear wheel 84 on the shaft 80. The rod 66 of the jaw 63 connects to a crank 85 on the outer end of the shaft 73 which carries the crank 72 at its other end. The arm provided with the closing finger 67 is by a link 86 connected to a lever 87 pivoted at 88 to the bed of the machine, and the end 89 of this lever is by a link 90 connected to a stud projecting upwardly from a slide 91 fitted to work in a horizontal guideway formed in or secured to the right-hand end of the bed plate. Motion is imparted to this slide 91 from a shaft 92 driven from the shaft 77 by the pair of gears 93, through the medium of the crank 94, on the end of the shaft 92, the connecting rod 95 joining the crank to the central part of the lever 96, which is connected at its lower end 97 to the frame of the machine and at its upper end by the link 98 to the slide 91. The second preliminary neck creasers and closers or those acting on the mouth of the bag are curved jaws 99 carried on the ends of curved arms 100 fitted to swing on a stud 101 projecting from the front face of the standard $q$ in such manner that the jaws may occupy a position in line below the hollow shaft $y$, Figs. 14 and 20, that is, a position ultimately occupied by the final mouth holding jaws 2, after the jaws 99 have been set in inoperative position. The upper ends of the arms carrying the jaws 99 are by short links 102 connected to the slotted end of the lever 103 fitted to rock on a stud 104 projecting from a bracket extending from the standard $q$, the other end of this lever, being a universal joint 105 and a rod 106, connected to one end of a lever 107 pivoted at 108 to the frame of the machine and having a roller at its other end working in the groove of a cam 109 secured to the left-hand end of the shaft $r$. At Fig. 16 the toggle link connection of the upper ends of the arms 100 of the mouth closers 99 with the lever 103 are shown in full lines when the closers 99 are open or in inoperative position and in dotted lines when they are in the low position to close the mouth of a bag.

I claim:—

1. In a bag tying machine, a preliminary neck creaser and closer adapted to act on and hold the lower part of the neck of a bag, an independent closing and holding device adapted to act on and hold the upper part of the neck or mouth of the bag after the preliminary closer has gathered and closed the neck of the bag, thus leaving an open space around the neck between the lower preliminary neck closer and holder and the lower edge of the mouth closer, and means for applying a fastener to the neck of the bag in said open space.

2. In a bag tying machine, a preliminary neck creaser and closer adapted to act on and hold the lower part of the neck of a bag, an upper independent preliminary closer adapted to act on the mouth of the bag, a closing and holding device adapted to act on and hold the upper part of the neck or mouth of the bag after the preliminary mouth closer has acted thereon, thus leaving an open space between the lower preliminary neck closer and holder and the lower edge of the mouth closer; and means for applying a fastener to the neck of the bag in said open space.

3. In a bag tying machine, a preliminary neck creaser and closer adapted to act on and hold the lower part of the neck of a bag, an independent upper preliminary closer adapted to act on the mouth of the bag, a closing and holding device adapted to act on and hold the upper part of the neck or mouth of the bag after the preliminary mouth closer has acted thereon leaving a space around the neck for the reception of a fastener between the lower preliminary neck closer and the lower edge of the mouth closer and holder.

4. In a bag tying machine, a preliminary creaser and closer adapted to close the lower part of the neck or mouth of a bag, an independent rotatable holder adapted to close over and rotate around the upper part of the neck for keeping the mouth of the bag closed after being closed by the preliminary closer leaving a space on the neck beneath the mouth holder for the reception of a fastener.

5. In a bag tying machine, a preliminary neck creaser and closer adapted to act on the lower part of the neck of a bag, an independent upper preliminary closer adapted to act on the mouth of the bag, a holding device adapted to act on the upper part of the neck or mouth of the bag after the preliminary mouth closer has acted thereon, thus leaving an open space around the neck between the lower neck closer and the mouth holder, means for first actuating the lower preliminary closer, then the mouth preliminary closer, and then the mouth holder, and means for applying a fastener to said open space around the neck between the lower neck closer and the mouth holder while held by said neck closer and mouth holder.

6. In a bag tying machine, a preliminary creaser and closer adapted to close the lower part of the neck or mouth of a bag, a holder for keeping the mouth of the bag closed after being closed by the preliminary closer, a vertical rotating shaft carrying at its lower end the bag mouth holder, and means, also carried by the vertical shaft, for applying a fastener, as twine, to the neck of the bag below the bag mouth holder.

7. In a bag tying machine, a preliminary neck creaser and closer adapted to act on and hold the lower part of the neck of a bag, an independent closing and holding device adapted to act on and hold the upper part of the neck or mouth of the bag, means for applying a fastener to the neck between the lower preliminary neck closer and holder and the lower edge of the mouth closer, a rotating shaft vertically arranged above the neck and mouth closers and holders and carrying at its lower end the mouth closer and holder and the means for applying the fastener.

8. In a bag tying machine, a preliminary neck creaser and closer adapted to act on and hold the lower part of the neck of a bag, an independent upper preliminary closer adapted to act on the mouth of the bag, a closing and holding device adapted to act on and hold the upper part of the neck or mouth of the bag after the preliminary mouth closer has acted thereon, means for applying a fastener to the neck between the lower preliminary neck closer and holder and the lower edge of the mouth closer, and a rotating shaft vertically arranged above the neck and mouth closers and holders and carrying at its lower end the mouth closer and holder and the means for applying the fastener.

9. In a bag tying machine, a hollow vertical shaft, means for holding a bag with its neck in line with the shaft, a closer and holder adapted to act on the upper part of the neck or mouth of the bag, comprising clamping jaws pivotally connected to the lower end of the shaft, a twine carrier also pivotally connected to the shaft and to which the tying twine passes from the bore of the shaft, means for closing the jaws of the neck closer and holder over the mouth of the bag and for setting the twine carrier in position to wrap the twine around the neck of the bag, and means for rotating the vertical shaft.

10. In a bag tying machine, a hollow vertical shaft, means for holding a bag with its neck in line with the shaft, a closer and holder adapted to act on the upper part of the neck or mouth of the bag, comprising clamping jaws pivotally connected to the lower end of the shaft, a twine carrier also pivotally connected to the shaft and to which the tying twine passes from the bore of the shaft, means for closing the jaws of the neck closer and holder over the mouth of the bag and for setting the twine carrier in position to wrap the twine around the neck of the bag, a preliminary closer comprising swinging jaws adapted to act on the mouth of the bag to crease and close it, means for closing the jaws over and moving them away from the mouth of the bag just before the mouth holder acts thereon, and means for rotating the vertical shaft.

11. In a bag tying machine, a hollow vertical shaft, means for holding a bag with its neck in line with the shaft, a closer and holder adapted to act on the upper part of the neck or mouth of the bag, comprising clamping jaws pivotally connected to the lower end of the shaft, a twine carrier also pivotally connected to the shaft and to which the tying twine passes from the bore of the shaft, means for closing the jaws of the neck closer and holder over the mouth of the bag and for setting the twine carrier in position to wrap the twine around the neck of the bag, a preliminary closer comprising swinging jaws adapted to act on the mouth of the bag to crease and close it, means for closing the jaws over and moving them away from the mouth of the bag just before the mouth holder acts thereon, and means for rotating the vertical shaft, a preliminary neck gatherer and closer adapted to act on the lower part of the neck, leaving a portion of the neck bare between it and the mouth holder.

12. In a bag tying machine, a hollow vertical shaft, means for holding a bag with its neck in line with the shaft, a closer and holder adapted to act on the upper part of the neck or mouth of the bag, comprising clamping jaws pivotally connected to the lower end of the shaft, a twine carrier secured to one of the mouth closing jaws and being thereby also pivotally connected to the shaft and to which the tying twine passes from the bore of the shaft, means for closing the jaws of the neck closer and holder over the mouth of the bag and for setting the twine carrier in position to wrap the twine around the neck of the bag, and means for rotating the vertical shaft.

13. In a bag tying machine, a twine carrier normally held out of the range of the neck of a bag to be tied, means for moving it toward the neck of the bag and means for rotating it around the neck, a gripping device for catching the free or leading end of the twine and holding it stationary as the twine is wrapped around the neck of the bag by the carrier, means for drawing the leading end of the twine over and between the strands or wrappings of the twine and the neck of the bag, and a twine cutter adapted to sever the feeding end of the twine after the leading end has been drawn behind the wrappings on the neck.

14. In a bag tying machine, a twine carrier normally held out of the range of the neck of a bag to be tied, means for moving it toward the neck of the bag and means for rotating it around the neck, a gripping device for catching the free or leading end of the twine and holding it stationary as the twine is wrapped around the neck of the bag by the carrier, means for causing the carrier to draw the twine tightly onto the neck of the bag during a portion of each revolution of the carrier, means for drawing the leading end of the twine over and between the strands or wrappings of the twine and the neck of the bag, and a twine cutter adapted to sever the feeding end of the twine after the leading end has been drawn behind the wrappings on the neck.

15. In a bag tying machine, a twine carrier normally held out of the range of the neck of a bag to be tied, means for moving it toward the neck of the bag and means for rotating it around the neck, a gripping device for catching the free or leading end of the twine and holding it stationary as the twine is wrapped around the neck of the bag by the carrier, a hooked finger operated to be set and held against the neck of the bag while the twine carrier is acting and to lie behind the wrappings of twine, means for raising the leading end of the twine over the hook of the finger, means for withdrawing the finger from behind the loops of the twine and causing the leading end of the twine to pass between all of the loops of twine and the neck of the bag, and a cutter for severing the twine at its feeding end near the twine carrier after the leading end has been drawn behind the loops.

16. In a bag tying machine, a twine carrier, means for moving it toward the neck of a bag and means for rotating it around the neck, a gripping device for catching the free or leading end of the twine and holding it as the twine is wrapped around the neck of the bag by the carrier, means for drawing the leading end of the twine over and between the strands or wrappings of the twine and the neck of the bag, a twine cutter, and a guide pin adapted to engage the last loop of twine made by the carrier and hold it in the sphere of action of the cutter which severs the feeding end of the twine as the carrier completes said last loop.

17. In a bag tying machine, a twine carrier, means for moving it toward the neck of a bag and means for rotating it around the neck, a gripping device for catching the free or leading end of the twine and holding it as the twine is wrapped around the neck of the bag by the carrier, means for causing the carrier to draw the twine tightly onto the neck of the bag during a portion of each revolution of the carrier, means for drawing the leading end of the twine over and between the strands or wrappings of the twine and the neck of the bag, a twine cutter, and a guide pin adapted to engage the last loop of twine made by the carrier and hold it in the sphere of action of the cutter which severs the feeding end of the twine as the carrier completes said last loop.

18. In a bag tying machine, a twine carrier, means for moving it toward the neck of the bag and means for rotating it around the neck, a gripping device for catching the free or leading end of the twine and holding it as the twine is wrapped around the neck of the bag by the carrier, a hooked finger to be set against the neck of the bag to lie behind the wrappings of twine, means for raising the leading end of the twine over the hook of the finger, means for withdrawing the finger from behind the loops of the twine and causing the leading end of the twine to pass between the loops of twine and the neck of the bag, and a guide pin for holding the last loop of twine in the sphere of action of a cutter for severing the twine at its feeding end and near the twine carrier.

19. In a bag tying machine, a twine carrier normally held out of the range of the neck of a bag to be tied, means for moving it toward the neck of the bag and means for rotating it around the neck, a gripping device for catching the free or leading end of the twine and holding it stationary as the twine is wrapped around the neck of the bag by the carrier, a friction jaw connected to the twine carrier and arranged to act on the twine as it enters the discharge opening of the twine carrier, a stationary cam ledge against which the friction jaw bears during a portion of each revolution of the carrier to impart tension to the twine, means for drawing the leading end of the twine over and between the strands or wrappings of the twine and the neck of the bag, and a twine cutter adapted to sever the feeding end of the twine after the leading end has been drawn behind the wrappings on the neck 20. In a bag tying machine, a twine carrier, means for moving it toward the neck of a bag and means for rotating it around the neck, a gripping device for catching the free or leading end of the twine and holding it as the twine is wrapped around the neck of the bag by the carrier, a hooked finger to be set against the neck of the bag to lie behind the wrappings of twine, means for raising the leading end of the twine over the hook of the finger, a friction jaw arranged to act on the twine as it enters the twine carrier, a stationary cam ledge against which the friction jaw bears during a portion of each revolution of the carrier to impart tension to the twine, means for withdrawing the finger from behind the loops of the twine and causing the leading end of the twine to pass between the loops of twine and the neck of the bag, and a cutter for severing the twine at its feeding end near the twine carrier.

21. In a bag tying machine, a twine carrier, means for moving it toward the neck of a bag and means for rotating it around the neck, a gripping device for catching the free or leading end of the twine and holding it as the twine is wrapped around the neck of the bag by the carrier, a hooked finger operated to be set against the neck of the bag to lie behind the wrappings of twine, means for raising the gripping device to place the leading end of the twine over the hook of the finger, means for withdrawing the finger from behind the loops of the twine and causing the leading end of the twine to pass between the loops of twine and the neck of the bag, means for opening the grippers to release the leading end of the twine as it is secured by the hooked finger, and a cutter for serving the twine at its feeding end near the twine carrier.

22. In a bag tying machine, a hollow vertical shaft, means for holding a bag with its neck in line with the shaft, a closer and holder adapted to act on the upper part of the neck or mouth of the bag, comprising clamping jaws pivotally connected to the lower end of the shaft, a twine carrier secured to one of the mouth closing jaws and being thereby also pivotally connected to the shaft and to which the tying twine passes from the bore of the shaft, a small guide pulley on the closing jaw that carries the carrier to guide the twine to said carrier and a finger at the end of the shaft for guiding the twine to the guide pulley as it leaves the bore of the shaft, means for closing the jaws of the neck closer and holder over the mouth of the bag and for setting the twine carrier in position to wrap the twine around the neck of the bag, and means for rotating the vertical shaft.

23. In a bag tying machine, a twine carrier, means for rotating it around the neck of a bag, a gripping device for catching the free or leading end of the twine and holding it as the twine is wrapped around the neck of the bag by the carrier, means for drawing the leading end of the twine over and between the strands or wrappings of the twine and the neck of the bag, and a twine cutter.

24. In a bag tying machine, a twine carrier, means for rotating it around the neck of a bag, a gripping device for catching the free or leading end of the twine and holding it as the twine is wrapped around the neck of the bag by the carrier, a hooked finger to be set against the neck of the bag to lie behind the wrappings of twine, means for raising the leading end of the twine over the hook of the finger, means for withdrawing the finger from behind the loops of the twine and causing the leading end of the twine to pass between the loops of twine and the neck of the bag, and a cutter for severing the twine at its feeding end near the twine carrier.

25. In a bag tying machine, a twine carrier, means for rotating it around the neck of a bag, a gripping device for catching the free or leading end of the twine and holding it as the twine is wrapped around the neck of the bag by the carrier, a friction jaw arranged to act on the twine as it enters the twine carrier, a stationary cam ledge against which the friction jaw bears during a portion of each revolution of the carrier to impart tension to the twine, means for drawing the leading end of the twine over and between the strands or wrappings of the twine and the neck of the bag, and a twine cutter.

In testimony whereof, I have hereunto subscribed my name.

HERMANN A. KLEMM.

Witnesses:
 EDWARD C. DAVIDSON.
 MARY DUTTON.